United States Patent [19]

Matsuura et al.

[11] Patent Number: 4,762,898
[45] Date of Patent: Aug. 9, 1988

[54] PROCESS FOR POLYMERIZING ETHYLENE

[75] Inventors: Mitsuyuki Matsuura; Katsumi Hirakawa, both of Yokkaichi, Japan

[73] Assignee: Mitsubishi Petrochemical Company Limited, Tokyo, Japan

[21] Appl. No.: 102,236

[22] Filed: Sep. 28, 1987

Related U.S. Application Data

[63] Continuation of Ser. No. 836,128, Mar. 4, 1986, abandoned.

[30] Foreign Application Priority Data

Mar. 8, 1985 [JP] Japan .................................. 60-45978
May 31, 1985 [JP] Japan ................................ 60-117831
Oct. 8, 1985 [JP] Japan ................................ 60-224112

[51] Int. Cl.$^4$ .......................... C08F 2/02; C08F 10/02
[52] U.S. Cl. .................................... 526/125; 502/121; 502/125; 502/126; 526/348.5; 526/902
[58] Field of Search ......................................... 526/125

[56] References Cited

U.S. PATENT DOCUMENTS

| 4,107,414 | 8/1978 | Giannini et al. | 526/125 |
|---|---|---|---|
| 4,107,415 | 8/1978 | Giannini et al. | 526/125 |
| 4,237,254 | 12/1980 | Kitagawa et al. | 526/125 |
| 4,402,863 | 9/1983 | Miyazaki et al. | 526/125 |
| 4,405,774 | 9/1983 | Miwa et al. | 526/125 |
| 4,581,426 | 4/1986 | Asanuma et al. | 526/125 |
| 4,701,505 | 10/1987 | Fujii et al. | 526/125 |

FOREIGN PATENT DOCUMENTS

| 58-206613 | 12/1983 | Japan | 526/125 |
|---|---|---|---|
| 59-204604 | 11/1984 | Japan | 526/125 |

OTHER PUBLICATIONS

Kinetics of Ethylene Polymerization at High Temperature with Ziegler-Natta Catalysts, Y. V. Kissin et al, J. Polymer Science 29, 1171-1182 (1984).

Primary Examiner—Edward J. Smith
Attorney, Agent, or Firm—Oblon, Fisher, Spivak, McClelland & Maier

[57] ABSTRACT

A process for polymerizing or copolymerizing ethylene comprises contacting ethylene or ethylene and at least one of α-olefins with a catalyst consisting essentially of a combination of (A) a solid catalyst component containing at least titanium, magnesium and chlorine, (B) an organoaluminum compound, and (C) an organic compound selected from the group consisting of a compound having P-O-C bond, a compound having B-O-C bond and a compound having C-O-R bond, at a temperature not lower than 125° C. and under a pressure not lower than 200 kg/cm$^2$.

10 Claims, No Drawings

PROCESS FOR POLYMERIZING ETHYLENE

This application is a continuation of application Ser. No. 836,128, filed on Mar. 4, 1986, now abandoned.

BACKGROUND OF THE INVENTION

1. Field of the Invention

This invention relates to a process for polymerizing ethylene at a temperature not lower than 125° C. and under a pressure not lower than 200 kg/cm² to produce polyethylene having a high molecular weight.

2. Prior Art

Recently, a process for polymerizing ethylene at a high temperature and under a high pressure in the presence of a Ziegler-type catalyst by using a conventional high-pressure ethylene-polymerization apparatus, as described in British Pat. No. 828,828 Specification, etc. has been proposed.

This method is advantageous for industrial production of linear-chain low-density polyethylene (LLDFE) for the following reasons.

First of all, conventional high-pressure polyethylene-producing apparatus can be used as they are; no investment in equipment is needed. Secondly, although removal of heat is a serious problem in the polymerization process because of the exothermic reaction of ethylene polymerization, by this method polymerization can be conducted at a high temperature to increase the temperature difference between the inner temperature and that of a cooling carrier, which results in increasing efficiency in removal of heat and, thus, enhancing conversion to polymers. Thirdly, it is not necessary to remove a solvent from the polymer produced, and the polymer can be readily separated. Fourth, because the resulting polymer is in a molten state, it is not necessary to melt the polymer for pelletizing unlike in the cases of liquid phase polymerization and suspension polymerization, and, thus, the method is advantageous with respect to energy.

On the other hand, a problem in high-temperature and high-pressure polymerization process is that polymers having a sufficiently low melt-flow index (hereinafter, abbreviated to MFR) cannot be produced since the chain transfer rate of ethylene is much greater than the growth rate of ethylene at a high temperature. This problem is particularly serious in the copolymerization of ethylene with an α-olefin. This is because the chain transfer rate of α-olefins is greater than that of ethylene, and, thus, lowering of the MFR of the resulting polymer becomes more difficult. The problem of the MFR of the resulting polymer being too high can be solved with a low polymerization temperature. Such solution of the problem, however, sets the upper limit of the polymerization temperature with respect to the MFR of the desired polymer, resulting in decrease in conversion to polymer.

Another problem in the above mentioned polymerization under high-temperature and high-pressure is that it is difficult to omit the step of removing catalyst residues. In the case where the catalyst employed has a low polymerization activity, a large amount of the catalyst residue remains in the resulting olefin polymer which raises serious problems with respect to the properties of the polymer product such as thermal stability, color, odor and the like.

Moreover, high-temperature and high-pressure polymerization is apt to produce a waxy polymer having a low molecular weight. Formation of such a low molecular-weight waxy polymer has an adverse effect on the commercial quality of the resulting polymer product.

In addition, there is a further problem in that the high-temperature and high-pressure polymerization produces a large amount of double bonds in the resulting polymer. When a large amount of double bonds is present in the polymer, especially inside of the polymer chain, the polymer is apt to oxidatively decompose and have reduced weather resistance.

Thus, it is important for industrialization of the above mentioned art to develop a catalyst which, in high-temperature high-pressure polymerization, has a high activity as well the capability to produce polymers having a broad range of MFR including a low MFR region and excellent quality.

SUMMARY OF THE INVENTION

An object of the present invention is to solve the above described problems, which object can be achieved by using a specified combination of catalyst components in the polymerization of ethylene.

Thus, the process for polymerizing ethylene according to the present invention comprises contacting ethylene or ethylene and at least one of α-olefins in the presence of a catalyst consisting essentially of a combination of the following components (A), (B), and (C) at a temperature not lower than 125° C. and under a pressure not lower than 200 kg/cm² thereby to polymerize the same:

(A) a solid catalyst component containing at least titanium, magnesium and chlorine;

(B) an organoaluminum compound; and (C) an organic compound selected from the group consisting of a compound having a P-O-C bond, a compound having a B-O-C bond, and a compound having a C-O-R bond and represented by the following formula (C-1), (C-2) or (C-3):

$$R^1C(OR^2)_3 \qquad (C\text{-}1)$$

(wherein: $R^1$ and $R^2$ each denote a hydrocarbon residue having 1 to 12 carbon atoms.), $$R^3R^4C(OR^5)_2 \qquad (C\text{-}2)$$

(wherein: $R^3$ and $R^5$ each denote a hydrocarbon residue having 1 to 12 carbon atoms and $R^4$ denotes hydrogen or a hydrocarbon residue having 1 to 12 carbon atoms; $R^3$ and $R^4$ may be bonded to each other to form a ring and two $R^5$ may be identical or different and may be bonded to each other to form a ring.), $$R^6R^7R^8C(OR^9) \qquad (C\text{-}3)$$

(wherein: $R^6$ and $R^9$ each denote a hydrocarbon residue having 1 to 12 carbon atoms, and $R^7$ and $R^8$ each denote hydrogen or a hydrocarbon residue having 1 to 12 carbon atoms; at least two of $R^6$, $R^7$, $R^8$ and $R^9$ may be bonded to each other to form a ring.).

By conducting homopolymerization or copolymerization of ethylene using specified catalyst components at a temperature not lower than 125° C. and under pressure not lower than 200 kg/cm² according to the present invention, it has become possible to produce, with high catalytic activity, polyethylene having a broad range of MFR including a low MFR region and to enhance polymer conversion rate owing to a rise in polymerization temperature.

In addition, in spite of high-temperature and high-pressure polymerization, the process according to the invention provides a polymer of good quality because of narrower distribution in molecular weight, a smaller amount of wax contained in the polymer and a reduced amount of double bonds in the polymer.

DETAILED DESCRIPTION OF THE INVENTION

Catalyst

The catalyst according to the present invention consists essentially of a combination of the following components (A), (B), and (C).

Component (A)

The component (A) is a solid catalyst component of a what is called "Ziegler-Natta catalysts", and comprises at least titanium, magnesium and chlorine.

Production of such catalyst components is known. Typically, the titanium compound is comprised in the component carried on the magnesium. The chlorine is provided usually by the titanium compound or magnesium compound used which usually has chlorine.

Examples of the magnesium compound for the production of the catalyst component (A) include magnesium oxide, magnesium hydroxide, dialkoxymagnesiums, diaryloxymagnesiums, alkoxymagnesium halides, aryloxy-magnesium halides, magnesium dihalides, magnesium dicarboxylates, organomagnesiums, and complexes of organomagnesiums with metal halides.

Examples of the titanium compounds for the production of the catalyst component (A) include titanium tetrahalides, titanium trihalides, alkoxytitanium halides, aryloxytitanium halides, and titanium alcoholates. The titanium compounds can either be pure titanium compounds as illustrated above or be complexes or mixtures thereof with other non-titanium compounds such as metallic aluminum, aluminum halides or electron donors. The titanium compounds are preferably trivalent under the conditions of polymerization under an elevated pressure and an elevated temperature.

Preferably, the catalyst component (A) has a titanium content of 0.5 to 15% by weight, Ti/Mg atomic ratio of 0.05 to 0.5, and a chlorine content of 30 to 70% by weight.

A more preferred catalyst component (A) is a solid composition which is a ground or pulverized mixture of the following components (1) through (4).

(1) Halogenomagnesium compound

Specific examples of the halogenomagnesium compound are magnesium dihalogenides such as $MgF_2$, $MgCl_2$, and $MgI_2$ and alkoxymagnesium chlorides such as ethoxymagnesium chloride and phenoxymagnesium chloride, the "alkyl" being preferably a lower alkyl or phenyl.

(2) Titanium trichloride

Specific examples of the titanium trichloride are those obtained through reduction of titanium tetrachloride with hydrogen [$TiCl_3(H)$], with aluminum metal [$TiCl_3(A)$], with an organoaluminum compound, with metallic titanium [$TiCl_3(T)$], or the like. Many other kinds thereof can be also used. The titanium trichloride employed herein need not be pure $TiCl_3$; for example, a $TiCl_3(A)$ adduct in which $\frac{1}{3}$ mol of $AlCl_3$ is added to $TiCl_3$ or a $TiCl_3$ mixture wherein such auxiliary component is afterwards introduced into $TiCl_3$ may also be used. It is also possible to use those $TiCl_3$ materials which have been further activated by pulverization or addition of oxygen.

(3) Electron donor

Generally, a compound known as an electron-donor compound can be used. Specifically, such compounds include, for example, water, alcohols, ethers, ketones, aldehydes, carboxylic acids, carboxylic acid esters, acid halides, acid anhydrides, acid amides, ketals, acetals, orthocarboxylic acid esters, nitriles, amines, silanols, alkoxysilanes, phosphorous acid, esters, phosphoric acid esters, sulfurous acid esters, and sulfuric acid esters. These can be used alone or in combination.

Among them, the following compounds (a) through (d) and especially (a) are preferred.

In the following, "alkyl" includes phenyl, and preferable number of carbon atoms of the alkyl is 1 to 4, namely the alkyl being a lower alkyl.

(a) Esters

Suitable esters are esters of an aliphatic or aromatic monobasic or dibasic carboxylic acid having approximately 2 to 12 carbon atoms with a mono- or polyalcohol (including an ether alcohol) having approximately 1 to 12 carbon atoms, and intramolecular esters of the hydroxy derivatives of these carboxylic acids.

Specific examples thereof include ethyl acetate, phenyl acetate, methyl methacrylate, ethyl benzoate, dibutyl succinate, dibutyl maleate, diheptyl phthalate, and γ-butyrolactone.

(b) Ketones

Suitable ketones are mono- or diketones having, in total, approximately 3 to 20 carbon atoms.

Specific examples thereof include acetone, methylethyl ketone, acetophenone, benzophenone, cyclohexanone, benzyl, and acetylacetone.

(c) Ethers

Suitable ethers are mono- or di-ethers having, in total, approximately 2 to 20 carbon atoms.

Specific examples thereof include diethyl ether, diisoamyl ether, anisole, diphenyl ether, tetrahydrofuran, and diphenyldimethoxy-methane.

(d) alkoxysilanes

Silicone compounds having an alkoxy group containing approximately 1 to 12 carbon atoms are preferred. It is preferable that the valencies of the silicon atoms in mono, di- and trialkoxysilanes be satisfied with hydrocarbon groups (of approximately 1 to 12 carbon atoms), halogen atoms (particularly chlorine atom) and/or oxygen atoms.

Specific examples thereof include tetraethylsilicate, tetrabutylsilicate, tetraphenylsilicate, methyltrimethoxysilane, ethyltrimethoxysilane, phenyltrimethoxysilane, dimethyldiethoxysilane, diphenyl dimethoxysilane, and triphenylmethoxysilane.

(4) Halogen compounds

The halogen compounds used herein are halogenides of the elements of Groups III through V in the Periodic Table. By the term "halogen compounds" herein is meant a compound in which at least one of the valencies of the element is satisfied with a halogen. The groups other than a halogen, which satisfy the valencies of the element, are represented by a hydrocarbyl group and a hydrocarbyloxy group.

Among them, the following compounds (a) through (c) and especially (a) are preferred.

(a) Halogenosilicon compound

Specific examples thereof include silicon tetrachloride, silicon tetrabromide, methyltrichlorosilane, dimethyldichlorosilane, phenyltrichlorosilane, and diethoxydichlorosilane.

(b) Halogenated phosphorus compound

Specific examples include phosphorus trichloride, phosphorus pentachloride, and phenylphosphonic dichloride.

(c) Halogenated aluminum

Specific examples include aluminum trichloride, and aluminum tribromide.

(d) Halogenocarbon compound

Specific examples include carbon tetrachloride, chloroform, butyl chloride, and chlorobenzene.

(5) Ratio of the compounds

The ratio in quantities of the compounds (1) through (4) are arbitrarily selected as long as the effects of the invention can be exhibited.

Preferably, the ratio of a halogenated magnesium to titanium trichloride represented by Mg/Ti molar ratio is not less than 2, more preferably 3 to 50. It is desirable that each of the electron donor and the halogenated compound be mixed and pulverized with other compounds in an amount within a range of 0.1 to 45% by weight, more preferably 1 to 20% by weight, on the basis of the total weight of the compounds (1) through (4).

(6) Mixing and pulverizing

For mixing and pulverizing of the solid catalyst components, any apparatus which enables intimate contact of the above mentioned four components can be used. Specifically, such apparatus are exemplified by a rotary ball mill, a rod mill, an impact mill, and a vibration mill.

Mixing and pulverizing operation is conducted to such an extent that significant improvement in the state of the four components can be obtained. From this point of view, the type of pulverization, conditions of pulverization, pulverizing period, pulverizing temperature and the like are suitably selected.

Both wet and dry pulverization methods can be used.

The order of addition and pulverization is optional. In the representative operation of mixing and pulverizing, all the four components are initially mixed and then pulverized. However, it is possible to add, to the mixing and pulverizing zones, each component continuously or discontinuously with the elapse of time. It is also possible to contact two or more of the four components in a liquid phase system or in another manner outside of the system and then to mix and pulverize the four components.

Component (B) (organoaluminum compound)

Specific examples of the organoaluminum compounds are the following compounds (a) through (e). The "alkyl" group preferably contains approximately 1 to 12 carbon atoms. The "alkyl" herein includes phenyl, and a preferable alkyl other than phenyl is a lower alkyl.

(a) Trialkylaluminum

The trialkylaluminum includes trimethylaluminum triethylaluminum, triisobutylaluminum, trioctylaluminum, tridecylaluminum, etc.

(b) Alkylaluminum halide

The alkylaluminum halides include diethylaluminum monochloride, diisobutylaluminum monochloride, ethylaluminum sesquichloride, ethylaluminum dichloride, etc.

(c) alkylaluminum hydrides

The alkylaluminum hydrides include diethylaluminum hydride, diisobutylaluminum hydride, etc.

(d) alkylaluminum alkoxides

The alkylaluminum alkoxides include diethylaluminum ethoxide, diethylaluminum butoxide, diethylaluminum phenoxide, etc.

(e) Alkylsiloxalans

The alkylsiloxalans include trimethyldimethylsiloxalan, trimethyldiethylsiloxalan, dimethylethyldiethylsiloxalan, etc. Generally, as the alkylsiloxalan those preliminarily synthesized by reacting a trialkylaluminum with a polysiloxane are used. However, those prepared in situ by mixing both reactants in a Si/Al atomic ratio in the range of 1 to 15 may be also used.

The organoaluminum compounds (a) through (e) can be used alone or in combination of two or more thereof.

Among them, it is particularly preferable for the high temperature polymerization according to the invention to use the alkylaluminum halide (b) alone or in combination with another organoaluminum compound.

Component (C)

The component (C) to be used in the present invention is at least one compound selected from the group consisting of compounds having a P-O-C bond, compounds having a B-O-C bond, and compounds having a C-O-R bond.

Compounds having P-O-C bond

The specific organic compounds having a P-O-C bond, which are used in the present invention, comprise the following compounds (a) and (b). The hydrocarbyl of R, X and Y is preferably a lower alkyl and phenyl.

(a) Phosphorus compounds represented by the general formula: $X_a Y_b P(OR)_c$, wherein: R denotes a hydrocarbon residue having 1 to 18 carbon atoms; each of X and Y denotes hydrogen atom, a halogen atom, hydroxyl group or a hydrocarbon residue having 1 to 12 carbon atoms; and a, b and c satisfy the following expressions, $$a+b+c=3,\ 0\leq a<3,\ 0\leq b<3\ \text{and}\ 0<c\leq 3.$$

Representative examples are ethyldiethylphosphinite, ethyldiphenylphosphinite, ethylphenylmethylphosphinite, diethylethylphosphonite, diethylphenylphosphonite, trimethylphosphite, triethylphosphite, tributylphosphite, tricyclohexylphosphite, triphenylphosphite, diphenylethylphosphite, diphenylchlorophosphite, and diethylbromophosphite.

(b) Phosphorus compounds represented by the general formula: $X_p Y_q P(O)(OR)_r$, wherein: R denotes a hydrocarbon residue having 1 to 18 carbon atoms; each of X and Y denotes hydrogen atom, a halogen atom, hydroxyl group or a hydrocarbon residue having 1 to 12 carbon atoms; and p, q and r satisfy the following expressions, $p+q+r=3,\ 0\leq p<3,\ 0\leq q<3$ and $0<r\leq 3$.

Representative examples are methyldiethylphosphinate, ethyldiphenylphosphinate, diphenylmethylphosphonate, diethylphenylphosphonate, triethylphosphate, tributylphosphate, triphenylphosphate, diphenylphosphoryl chloride, and phenylphosphoryl dichloride.

Among them, preferred are the phosphorus compounds (a) and (b) wherein X and/or Y is neither hydrogen, a halogen nor hydroxyl, such as ethyldiphenylphosphinite, diethylphenylphosphonite, triethylphosphite, triphenylphosphite, as well as ethyldiphenylphosphinate, diphenylmethylphosphonate, tributylphosphate, triphenylphosphate, and the like. More preferred are phosphite esters of the compounds (a).

Compounds having B-O-C bond

The organic compounds having a B-O-C bond, which are used in the present invention, are typically esters of boric acid or of mono- or dihydrocarbylboric acid. The group which is derived from an alcohol and constitutes the ester preferably contains approximately 1 to 20 carbon atoms. The hydrocarbyl group in the hydrocarbylboric acid preferably contains approximately 1 to 12 carbon atoms.

The hydroxyl concerned is preferably a lower alkyl and phenyl.

Specifically, the following compounds are examples:

(a) trimethyl borate, triethyl borate, tri-n-propyl borate, triisopropyl borate, tributyl borate, triphenyl borate, tritolyl borate; (b) dimethyl methylborate, diethyl methylborate, dibutyl methylborate, diphenyl methylborate, dimethyl ethylborate, diethyl ethylborate, diphenyl ethylborate, diethyl butylborate, dimethyl phenylborate, diethyl phenylborate, dibutyl phenylborate, diphenyl phenylborate, dimethyl cyclohexylborate, diethyl vinylborate; and (c) methyl dimethylborate, ethyl dimethylborate, phenyl dimethylborate, methyl diethylborate, ethyl diphenylborate, phenyl diphenylborate, ethyl phenylmethylborate, and butyl phenylethylborate.

Among them, particularly preferred are triesters of boric acid, especially lower trialkyl borates and triphenyl borate.

Compounds having C-O-R bond

The compounds having a C-O-R bond, which can be effective in the present invention, are oxygen-containing compounds represented by the following general formulae (1) through (3).

The hydrocarbyl concerned is preferably a lower alkyl and phenyl.

$$R^1C(OR^2)_3 \qquad (1)$$

wherein $R^1$ and $R^2$ each denote a hydrocarbon residue having 1 to 12 carbon atoms.

These compounds are generally referred to as orthocarboxylic acid esters and illustrated by the following compounds: methyl orthoacetate, ethyl orthoacetate, ethyl orthopropionate, and ethyl orthobenzoate. Among them, methyl orthobenzoate, ethyl orthobenzoate and the like which have phenyl group at the α-position are preferred.

$$R^3R^4C(OR^5)_2 \qquad (2)$$

wherein: $R^3$ and $R^5$ each denote a hydrocarbon residue having 1 to 12 carbon atoms, and $R^4$ denotes hydrogen or a hydrocarbon residue having 1 to 12 carbon atoms; $R^3$ and $R^4$ may be bonded to each other to form a ring; and two $R^5$ may be identical or different, and may be bonded to each other to form a ring.

The compounds wherein both the $R^3$ and $R^4$ denote a hydrocarbon residue are generally referred to as ketal, whereas the compounds wherein $R^4$ is hydrogen are referred to as acetal. For example, the compounds wherein two $R^5$ are bonded to each other by the use of ethylene glycol are referred to as ethylene ketals or ethylene acetals.

Specific examples of such compounds include the following compounds: (a) ketal compounds such as 2,2-dimethoxypropane, 2,2-diethoxypropane 2,2-dimethoxy-4-methylpentane, 1,1-dimethoxycyclohexane, 1,1-dimethoxy-1-phenylethane, diphenyldimethoxymethane, and diphenylethylene ketal, and (b) acetal compounds such as 1,1-dimethoxyethane, 3,3-dimethoxypropane, phenyldimethoxymethane, phenyldiethoxymethane, and phenylethylene acetal.

Among them, such compounds which have phenyl group at the α-position, such as diphenyldimethoxymethane, diphenyldiethoxymethane, 1,1-dimethoxy-1-phenylethane, and phenyldimethoxymethane are preferred.

$$R^6R^7R^8C(OR^9) \qquad (3)$$

wherein: $R^6$ and $R^9$ each denote a hydrocarbon residue having 1 to 12 carbon atoms, and $R^7$ and $R^8$ each denote hydrogen or a hydrocarbon residue having 1 to 12 carbon atoms; and at least two of $R^6$, $R^7$, $R^8$ and $R^9$ may be bonded to each other to form a ring.

These compounds are generally referred to as ethers.

Specific examples of such compounds include the following compounds: diethyl ether, diisoamyl ether, diphenyl ether, 1-methoxy-1-phenylmethane, 1-methoxy-1-phenylethane, 1-methoxy-1-methyl-1-phenylethane, 1,1-diphenyl-1-methoxyethane, 1,1-diphenyl-1-ethoxyethane, and 1-methoxy-1,1,1-triphenylmethane.

Among them, ether compounds having phenyl group at α-position, such as 1-methoxy-1-phenylmethane, 1-methoxy-1-phenylethane, 1-methoxy-1-methyl-1-phenylethane, 1,1-diphenyl-1-methoxymethane, 1,1-diphenyl-1-methoxyethane, and 1,1-diphenyl-1-ethoxymethane are preferred.

Among those compounds having C-O-R bond, particularly preferred are the orthocarboxylic acid esters, as well as acetals and ketals represented by the general formulae: $R^1C(OR^2)_3$ and $R^3R^4C(OR^5)_2$, respectively.

Preparation of Catalyst

The catalyst according to the present invention consisting essentially of a combination of the catalyst components (A), (B) and (C) can be prepared by mixing these components at one time or stepwise and then, as necessary, subjecting the resulting mixture to pulverization treatment.

The compound of the component (C) may be preliminarily mixed with the component (A) and/or component (B). It is also possible to prepare a catalyst precursor consisting of a combination of the components (A) and (B) and then introduce thereinto the component (C) when or before an olefin to be polymerized is introduced to form the catalyst in coexistence with the olefin.

Ratio of Catalyst Components

The ratio of the quantities of the catalyst components is such as to give an atomic ratio of the aluminum atom in the organoaluminum compound (B) to the titanium atom in the solid catalyst component (A) (Al/Ti atomic ratio) in the range of 1 to 100, preferably 3 to 50. Also, the molar ratio of the component (C) to the aluminum in the component (B); namely, molar ratio of the phosphorus compound (C) to Al, the oxygen-containing compound (C) to Al or boron atom in the boron compound (C) to Al (B/Al) is in the range of 0.05 to 2, preferably 0.1 to 1.

Polymerization of Ethylene

The polymerization reaction conducted by using the above mentioned catalyst system according to the invention is homopolymerization of ethylene or copolymerization of ethylene with at least one of the α-olefins represented by the general formula: R—CH=CH$_2$.

Polymerization apparatus

The polymerization operation according to the present invention is generally carried out continuously, although a batch-wise method can also be employed. As a polymerization apparatus those generally utilized for high-pressure radical polymerization of ethylene can be used. Specific examples thereof include a continuously stirring tank-type reactor and a continuous operation-type tubular reactor.

Polymerization can be conducted by a single zone method by using one of such single reactors. Also, polymerization can be conducted by using a plurality of reactors connected in series, as necessary equipped with a condenser. Moreover, it is possible to employ a single reactor the interior of which is effectively divided into several regions so as to conduct multi-zone operation. In the multi-zone operation, it is possible to differentiate the reaction conditions in each zone by adjusting the monomer composition, catalyst concentration, amount of molecular weight regulator, etc. in each of the reactors or reaction zones so as to control the characteristics of the polymer obtained in each polymerization zone. In the case where plural reactors are combined, various combinations can be adopted, such as combinations of a tubular reactor with another tubular one, a tank reactor with another tank reactor, and a tank reactor with a tubular one.

The polymer produced in the reactor can be isolated from unreacted monomer(s) and then treated similarly as in the case of high-pressure polyethylene. The unreacted monomer(s) can be pressurized again and circulated into the reactor.

The catalyst is preferably injected directly into the reactor by means of a pump in the form of a fine dispersion in a suitable inert solvent. The inert solvents suitably used herein include, for example, hydrocarbon solvents such as white spirit, hydrocarbon oils, pentane, hexane, cyclohexane, heptane, and toluene.

Monomer and Copolymer

Homopolymerization of ethylene can be carried out by using the catalyst system according to the present invention. Usually, there is obtained by the polymerization high-density polyethylene having a specific gravity in the range of 0.95 to 0.97. It is also possible to conduct copolymerization of ethylene with at least one of $\alpha$-olefins. By this copolymerization, there can be obtained linear-chain medium- or low-density polyethylene having a specific gravity in the range of approximately 0.89 to 0.95. The process of the invention is particularly suitable for production of such copolymer, and medium- or low-density ethylene copolymers can be obtained in a high yield.

The comonomers to be used for the copolymerization are preferably $\alpha$-olefins represented by the general formula: R—CH=CH$_2$, wherein R denotes a hydrocarbon residue having 1 to 12 carbon atoms. Specific examples thereof include propylene, butene-1, pentene-1, hexene-1, heptene-1, octene-1, nonene-1, decene-1, and 4-methylpentene-1. Not only one of the olefins but also two or more thereof can be used for the copolymerization with ethylene. Such $\alpha$-olefins can be copolymerized in an amount of 0 to 30% by weight, preferably 3 to 20% by weight of the resulting copolymer.

Polymerization Conditions (1) Polymerization pressure.

The pressure applied in the present process is at least 200 kg/cm$^2$, preferably in the range of 500 to 2,500 kg/cm$^2$.

(2) Polymerization temperature

The temperature employed in the present process is at least 125° C., preferably in the range of 150° C. to 350° C., more preferably in the range of 200° C. to 320° C.

(3) Composition of gases supplied to a reactor

The gaseous composition supplied to a reactor according to the present invention is in the range of 5 to 100% by weight of ethylene, 0 to 95% by weight of at least one of $\alpha$-olefins, and, as a molecular weight regulator, 0 to 20 molar % of hydrogen.

(4) Residence time

The average residence time in a reactor depends on the activity-holding time of the catalyst employed. It is preferable that the longer the activity-holding time of the catalyst is, the longer will the average residence time be.

The average residence time in the present invention is in the range of 2 to 600 seconds, preferably in the range of 5 to 150 seconds, and more preferably in the range of 10 to 120 seconds.

(5) Other conditions

In the present invention, a liquid medium is introduced only in a small amount as a catalyst-dispersing agent or for other purposes, and polymerization is conducted substantially in the absence of a liquid medium.

EXPERIMENTAL EXAMPLES

Example A1

Preparation of solid catalyst component (A)

A stainless-steel pot having an internal volume of 1 liter was charged with 900 ml in apparent volume of stainless steel balls 12.7 mm in diameter. Added thereto were 40 g of titanium trichloride (which had been obtained through reduction with metallic aluminum [TiCl$_3$(AA)] and preliminarily subjected to pulverization treatment for 40 hours), 130 g of anhydrous magnesium chloride, 15 g of silicon tetrachloride and 15 g of methyl methacrylate. The pot was sealed under nitrogen atmosphere, and then placed in a vibration mill for 80 hours under the conditions of a vibrational amplitude of 5 mm and a motor speed of 1,700 rpm. The resulting pulverized product is hereinafter referred to as A-1A.

The solid catalyst component (A-1A) thus obtained supported 5.07% by weight of Ti.

Preparation of a catalyst dispersion

Into a 1-liter flask sufficiently purged with nitrogen were introduced 400 ml of n-heptane which had been sufficiently deaerated and purified, 10 g of the solid catalyst component A-1A obtained above, and then 15.3 g of diethylaluminum chloride (B), followed by introduction of 66 ml of hexene-1 which had been sufficiently deaerated and purified. The mixture in the flask was subjected to reaction at 60° C. for 1.5 hours.

The catalyst dispersion was diluted with n-heptane to a concentration of 0.4 g of solid catalyst per liter of hexane and then supplied with triethyl phosphite (C) in such an amount as to make the molar ratio of P to Al 0.15 [P/Al (molar ratio)=0.15] to obtain a catalyst dispersion.

High-pressure polymerization of ethylene

Ethylene and hexene-1 were copolymerized by using a tubular reactor 4.8 mm in inner diameter and 84 m in length under the conditions shown in Table 1.

The results of the polymerization are shown in Table 1.

Example A2

The procedures in Example A1 were repeated except that diethylphenyl phosphonate was used, instead of triethyl phosphite as a catalyst component (C), in such an amount as to make P/Al (molar ratio) 0.25.

The polymerization conditions and the results thereof are listed in Tables 1 and 2, respectively.

Example A3

The procedures in Example A1 were repeated except that ethyldiphenyl phosphinite was used, instead of triethyl phosphite as a catalyst component (C) in such an amount as to make P/Al (molar ratio) 0.5.

The polymerization conditions and the results thereof are shown in Tables 1 and 2, respectively.

Example A4

The procedures in Example A1 were repeated except that tributyl phosphate was used, instead of triethyl phosphite as a catalyst component (C) in such an amount as to make P/Al (molar ratio) 0.25.

The polymerization conditions and the results thereof are shown in Tables 1 and 2, respectively.

Comparative Example A1

The procedures in Example A1 were repeated except that the triethyl phosphite as a catalyst component (C) was not used in the preparation of the catalyst dispersion.

The polymerization conditions and the results thereof are shown in Tables 1 and 2, respectively.

Example A5

Preparation of solid catalyst component (A)

A stainless steel pot having an internal volume of 1 liter was charged with 900 ml in apparent volume of stainless steel balls 12.7 mm in diameter. Added thereto were 40 g of titanium trichloride (which had been obtained through reduction with metallic aluminum [TiCl$_3$(AA)] and preliminarily subjected to pulverization treatment for 40 hours), 130 g of anhydrous magnesium chloride, 15 g of silicon tetrachloride and 15 g of di-n-butyl phthalate. The pot was sealed under nitrogen atmosphere and then placed in a vibration mill for 80 hours under the conditions of a vibrational amplitude of 5 mm and a motor speed of 1,700 rpm. The resulting pulverized product is hereinafter referred to as A-2A.

The solid catalyst component (A-2A) thus obtained carried 4.96% by weight of Ti.

Preparation of catalyst dispersion

Into a 1-liter flask sufficiently purged with nitrogen were introduced 400 ml of n-heptane which had been sufficiently deaerated and purified, 10 g of the solid catalyst component A-2A obtained above, and then 15.0 g of diethylaluminum chloride (B), followed by introduction of 64.5 ml of hexene-1 which had been sufficnetly deaerated and purified. The mixture in the flask was subjected to reduction at 60° C. for 1.5 hours.

This catalyst dispersion was diluted with n-heptane to a concentration of 0.4 g of solid catalyst per liter of heptane and then supplied with triethyl phosphite (C) in such an amount as to make the P/Al molar ratio 0.15 to produce a catalyst dispersion.

High-pressure polymerization of ethylene

Polymerization procedures similar to those of Example A1 were carried out.

The polymerization conditions and the results thereof are shown in Tables 1 and 2, respectively.

Comparative Example A2

The procedures in Example A5 were repeated except that the triethyl phosphite as a catalyst component (C) was not used in the preparation of the catalyst dispersion.

The polymerization conditions and the results thereof are shown in Tables 1 and 2, respectively.

Example A6

Preparation of solid catalyst component (A)

A stainless steel pot having an internal volume of 1 liter was charged with 900 ml in apparent volume of stainless steel balls 12.7 mm in diameter. Added thereto were 40 g of titanium trichloride (which had been obtained throuogh reduction with metallic aluminum [TiCl$_3$(AA)] and preliminarily subjected to pulverization treatment for 40 hours), 130 g of anhydrous magnesium chloride, 15 g of silicon tetrachloride and 15 g of dibutyl ether. The pot was sealed under nitrogen atmosphere and then placed in a vibration mill for 80 hours under the conditions of a vibrational amplitude of 5 mm and a motor speed of 1,700 rpm. The resulting pulverized product is hereinafter referred to as A-3A.

The solid catalyst component (A-3A) thus obtained carried 4.82% by weight of Ti.

Preparation of a catalyst dispersion

Into a 1-liter flask amply purged with nitrogen were introduced 400 ml of n-heptane which had been amply deaerated and purified, 10 g of the solid catalyst component A-3A obtained above, and then 14.6 g of diethylaluminum chloride (B), followed by introduction of 62.9 ml of hexene-1 which had been amply deaerated and purified. The mixture in the flask was caused to react at 60° C. for 1.5 hours.

The catalyst dispersion was diluted with n-heptane to a concentration of 0.4 g of solid catalyst per liter of hexane and then supplied with tributyl phosphite (C) in such an amount as to make the molar ratio P/Al 0.25 to obtain a catalyst dispersion.

High-pressure polymerization of ethylene

Polymerization was conducted similarly as in Example A1.

The polymerization conditions and the results thereof are shown in Tables 1 and 2, respectively.

Comparative Example A3

The procedures in Example A6 were repeated except that the tributyl phosphite as a catalyst component (C) was not used in the preparation of the catalyst dispersion.

The polymerization conditions and the results thereof are shown in Tables 1 and 2, respectively.

Example A7

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been obtained through reduction with metallic aluminum [TiCl$_3$(AA)] and preliminarily subjected to pulverization treatment for 40 hours), 130 g anhydrous magnesium chloride, 15 g of silicon tetrachloride and 15 g of tetraethyl silicate. The pot was sealed under nitrogen atmosphere and then placed in a vibration mill for 80 hours under the conditions of a vibrational amplitude of 5 mm and a motor speed of 1,700 rpm. The resulting pulverized product is hereinafter referred to as A-4A.

The solid catalyst component (A-4A) thus obtained carried 4.78% by weight of Ti.

Preparation of a catalyst dispersion

Into a 1-liter flask amply purged with nitrogen were introduced 400 ml of n-heptane which had been amply deaerated and purified, 10 g of the solid catalyst component A-4A obtained above, and then 14.4 g of diethylaluminum chloride (B), followed by introduction of 62.4 ml of hexene-1 which had been amply deaerated and purified. The mixture in the flask was caused to react at 60° C. for 1.5 hours.

The catalyst dispersion was diluted with n-heptane to a concentration of 0.4 g of solid catalyst per liter of n-heptane and then supplied with triphenyl phosphate (C) in such an amount as to make the molar ratio P/Al 0.25 to produce a catalyst dispersion.

High-pressure polymerization of ethylene

Polymerization was conducted similarly as in Example A1.

The polymerization conditions and the results thereof are shown in Tables 1 and 2, respectively.

Comparative Example A4

The procedures in Example A7 were repeated except that the triphenyl phosphate as a catalyst component (C) was not used in the preparation of the catalyst dispersion.

The polymerization conditions and the results thereof are shown in Tables 1 and 2, respectively.

Example A8

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been obtained through reduction with metallic aluminum [TiCl$_3$(AA)] and preliminarily subjected to pulverization treatment for 40 hours), 130 g of anhydrous magnesium chloride and 30 g of methyl methacrylate. The pot was sealed under a nitrogen atmosphere and then placed in a vibration mill for 80 hours under the conditions of a vibrational amplitude of 5 mm and a motor speed of 1,700 rpm. The resulting pulverized product is hereinafter referred to as A-5A.

The solid catalyst component (A-5A) thus obtained carried 4.72% by weight of Ti.

Preparation of a catalyst dispersion

Into a 1-liter flask amply purged with nitrogen were introduced 400 ml of n-heptane which had been amply deaerated and purified, 10 g of the solid catalyst component A-5A obtained above, and then 14.2 g of diethylaluminum chloride (B), followed by introduction of 61.6 ml of hexene-1 which had been amply deaerated and purified. The mixture in the flask was caused to react at 60° C. for 1.5 hours.

The catalyst dispersion was diluted with n-heptane to a concentration of 0.4 g of solid catalyst per liter of n-heptane and then supplied with triethyl phosphite (C) in such an amount as to make the molar ratio P/Al 0.15 to obtain a catalyst dispersion.

High-pressure polymerization of ethylene

Polymerization was conducted similarly as in Example A1.

The polymerization conditions and the results thereof are shown in Tables 1 and 2, respectively.

Comparative Example A5

The procedures in Example A8 were repeated except that the triethyl phosphite as a catalyst component (C) was not used in the preparation of the catalyst dispersion.

The polymerization conditions and the results thereof are shown in Tables 1 and 2, respectively.

Example A9

Preparation of solid catalyst component (A)

Into a 1-liter flask amply purged with nitrogen were introduced successively 200 ml of n-heptane which had been amply deaerated and purified, 1 mol of MgCl$_2$, 3.5 mmol of AlCl$_3$ and 0.028 mol of Ti(OC$_4$H$_9$)$_4$. 0.07 mol of n-butanol was introduced thereinto. The temperature was raised to 70° C., and the mixture was stirred for 1 hour.

Then 0.02 mol of titanium tetrachloride and 1.5 mol of methylhydrogenpolysiloxane were introduced thereinto, and the resulting mixture was stirred for an additional 1 hour.

After termination of the reaction, the reaction product was amply washed with heptane to obtain a solid catalyst component (A-6A).

The Ti content of this catalyst was 8.1% by weight. This catalyst is hereinafter referred to as A-6A.

Preparation of a catalyst dispersion

Into a 1-liter flask amply purged with nitrogen were introduced 400 ml of n-heptane which had been amply deaerated and purified, 10 g of the solid catalyst component A-6A obtained above, and then 24.5 g of diethylaluminum chloride (B), followed by introduction of 105.7 ml of hexene-1 which had been amply deaerated and purified. The mixture in the flask was caused to react at 60° C. for 1.5 hours.

The catalyst dispersion was diluted with n-heptane to a concentration of 0.4 g of solid catalyst per liter of hexane and then supplied with triethyl phosphite (C) in such an amount as to make the molar ratio P/Al 0.15 to obtain a catalyst dispersion.

High-pressure polymerization of ethylene

Polymerization was conducted similarly as in Example A1.

The polymerization conditions and the results thereof are shown in Tables 1 and 2, respectively.

Comparative Example A6

The procedures in Example A9 were repeated except that the triethyl phosphite as a catalyst component (C) was not used in the preparation of the catalyst dispersion.

TABLE 1

| Experiments | Conditions of preparing catalyst | | | | Polymerization conditions | | Conditions of supplying monomers | | | |
|---|---|---|---|---|---|---|---|---|---|---|
| | Catalyst component(A) | Catalyst component(B) | Catalyst component(C) | (C)/(B) (mole ratio) | Pressure (kg/cm$^2$) | Temperature(°C.) | Total supply (kg/hr) | Co-monomer | Qy't of co-monomer (wt. %) | Q'ty of hydrogen (mole %) |
| Exam. A1 | A-1A | DEAC | Triethyl phosphite | 0.15 | 980 | 250 | 30 | Hexene-1 | 50 | 0.3 |

TABLE 1-continued

| | Conditions of preparing catalyst | | | | Polymerization conditions | | Conditions of supplying monomers | | | |
|---|---|---|---|---|---|---|---|---|---|---|
| Experiments | Catalyst component(A) | Catalyst component(B) | Catalyst component(C) | (C)/(B) (mole ratio) | Pressure (kg/cm²) | Temperature(°C.) | Total supply (kg/hr) | Co-monomer | Qy't of co-monomer (wt. %) | Q'ty of hydrogen (mole %) |
| Exam. A2 | " | " | Diethylphenyl phosphonate | 0.25 | " | " | " | " | " | " |
| Exam. A3 | " | " | Ethyldiphenyl phosphinite | 0.5 | " | " | " | " | " | " |
| Exam. A4 | " | " | Tributyl phosphate | 0.25 | " | " | " | " | " | " |
| Comp. Exam. A1 | " | " | — | 0 | " | " | " | " | " | " |
| Exam. A5 | A-2A | " | Triethyl phosphite | 0.15 | " | " | " | " | " | " |
| Comp. Exam. A2 | " | " | — | 0 | " | " | " | " | " | " |
| Exam. A6 | A-3A | " | Tributyl phosphite | 0.25 | " | " | " | " | " | " |
| Comp. Exam. A3 | " | " | — | – | – | – | – | – | – | – |
| Exam. A7 | A-4A | " | Triphenyl phosphate | 0.25 | " | " | " | " | " | " |
| Comp. Exam. A4 | " | " | — | 0 | " | " | " | " | " | " |
| Exam. A8 | A-5A | " | Triethyl phosphite | 0.15 | " | " | " | " | " | " |
| Comp. Exam. A5 | " | " | — | 0 | " | " | " | " | " | " |
| Exam. A9 | A-6A | " | Triethyl phosphite | 0.15 | " | " | " | " | " | " |
| Comp. Exam. A6 | " | — | — | 0 | " | " | " | " | " | " |

TABLE 2

| | (Results of Polymerization) | | | | | Double bond (number/1000C)[1] | | | | Hexane[2] |
|---|---|---|---|---|---|---|---|---|---|---|
| Experiments | Catalyst activity g-PE/g-(A) | MFR g/10 min. | FR | Polymer density | Q value (Mw/Mn) | Trans | Terminal vinyl | Vinylidene | Total | solubles (% by wt.) |
| Exam. A1 | 11500 | 0.88 | 8.0 | 0.9325 | 3.9 | 0.07 | 0.68 | 0.08 | 0.83 | 0.8 |
| Exam. A2 | 12300 | 1.03 | 8.2 | 0.9323 | 4.1 | 0.08 | 0.70 | 0.07 | 0.85 | 0.9 |
| Exam. A3 | 14300 | 2.40 | 8.1 | 0.9322 | 4.2 | 0.09 | 0.88 | 0.08 | 1.05 | 1.6 |
| Exam. A4 | 13800 | 1.58 | 7.8 | 0.9328 | 3.8 | 0.09 | 0.87 | 0.08 | 1.04 | 1.5 |
| Comp. Exam. A1 | 14100 | 12.37 | 7.8 | 0.9331 | 3.8 | 0.11 | 0.98 | 0.11 | 1.20 | 3.6 |
| Exam. A5 | 13000 | 0.78 | 8.3 | 0.9318 | 4.3 | 0.06 | 0.66 | 0.07 | 0.79 | 1.0 |
| Comp. Exam. A2 | 16200 | 14.02 | 8.2 | 0.9322 | 4.1 | 0.11 | 1.10 | 0.12 | 1.33 | 3.8 |
| Exam. A6 | 7700 | 3.05 | 8.2 | 0.9331 | 4.2 | 0.09 | 0.98 | 0.09 | 1.16 | 2.0 |
| Comp. Exam. A3 | 9400 | 9.55 | 8.2 | 0.9330 | 4.2 | 0.11 | 1.31 | 0.11 | 1.53 | 4.0 |
| Exam. A7 | 10800 | 4.55 | 7.8 | 0.9335 | 3.7 | 0.09 | 0.85 | 0.10 | 1.04 | 2.2 |
| Comp. Exam. A4 | 12800 | 8.05 | 7.7 | 0.9338 | 3.6 | 0.10 | 0.92 | 0.10 | 1.12 | 4.2 |
| Exam. A8 | 7100 | 1.26 | 7.9 | 0.9322 | 3.7 | 0.09 | 0.71 | 0.08 | 0.88 | 1.1 |
| Comp. Exam. A5 | 9000 | 10.22 | 8.2 | 0.9330 | 4.0 | 0.10 | 1.10 | 0.11 | 1.42 | 4.2 |
| Exam. A9 | 9200 | 0.72 | 8.3 | 0.9338 | 4.3 | 0.08 | 0.60 | 0.09 | 0.77 | 1.0 |
| Comp. Exam. A6 | 11600 | 6.2 | 8.7 | 0.9341 | 4.8 | 0.11 | 0.98 | 0.12 | 1.21 | 3.8 |

Note:
[1] Determined by means of infrared spectra.
[2] 8 hour-extracts with boiling hexane.

Example B1

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulverized for 40 hours), 130 g anhydrous magnesium chloride, 15 g of silicon tetrachloride and 15 g of silicon tetrachloride. The mixture in the pot was sealed under a nitrogen atmosphere and then pulverized in a vibration mill for 80 hours under the conditions of a vibrational amplitude of 5 mm and a motor speed of 1,700 rpm. The resulting pulverized product is hereinafter referred to as A-1B.

The Ti content carried in the solid catalyst component (A-1B) thus obtained was 4.95% by weight.

Preparation of a catalyst dispersion

Into a 1-liter flask amply purged with nitrogen were introduced 400 ml of n-heptane which had been amply deaerated and purified, 10 g of the solid catalyst component (A-1B) mentioned above, 14.9 g of diethylaluminum chloride (B), and 64.6 ml of hexene-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to produce a catalyst dispersion having a concentration of 0.4 g solid catalyst per liter of heptane.

High-pressure polymerization of ethylene

Copolymerization of ethylene with hexene-1 was carried out by using a tubular reactor 4.8 mm in diameter and 84 m in length under the conditions as shown in Table 3.

The results of the polymerization are shown in Table 4.

Example B2

The procedures in Example B1 were repeated except that the triethyl borate as a catalyst component (C) was used in such an amount as to make the molar ratio B/Al 0.25.

The polymerization conditions and the results thereof are shown in Tables 3 and 4, respectively.

Example B3

The procedures in Example B1 were repeated except that trimethyl borate was used instead of the triethyl borate as a catalyst component (C) in such an amount as to make the molar ratio B/Al 0.1.

The polymerization conditions and the results thereof are shown in Tables 3 and 4, respectively.

Example B4

The procedures in Example B1 were repeated except that triphenyl borate was used instead of the triethyl borate as a catalyst component (C) in such an amount as to make the molar ratio B/Al 0.2.

The polymerization conditions and the results thereof are shown in Tables 3 and 4, respectively.

Example B5

The procedures in Example B1 were repeated except that diethyl phenylborate was used instead of the triethyl borate as a catalyst component (C) in such an amount as to make the molar ratio B/Al 0.3.

The polymerization conditions and the results thereof are shown in Tables 3 and 4, respectively.

Comparative Example B1

The procedures in Example B1 were repeated except that the triethyl borate as a catalyst component (C) was not used in the preparation of a catalyst dispersion.

The polymerization conditions and the results thereof are shown in Tables 3 and 4, respectively.

Example B6

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulverized for 40 hours), 130 g of anhydrous magnesium chloride, 15 g of silicon tetrachloride and 15 g of di-n-butyl phthalate. The mixture in the pot was sealed under nitrogen atmosphere and then pulverized in a vibration mill for 80 hours under the conditions of a vibrational amplitude of 5 mm and a motor speed of 1,700 rpm. The resulting pulverized product is hereinafter referred to as A-2B.

The Ti content carried in the solid catalyst component (A-2B) thus obtained was 4.96% by weight.

Preparation of a catalyst dispersion

Into a 1-liter flask amply purged with nitrogen were introduced 400 ml of n-heptane which had been amply deaerated and purified, 10 g of the solid catalyst component (A-2B) mentioned above, 15.0 g of diethylaluminum chloride (B), and 64.5 ml of hexene-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to obtain a catalyst dispersion having a concentration of 0.4 g of solid catalyst per liter of heptane.

High-pressure polymerization of ethylene

Polymerization was carried out similarly as in Example B1.

The polymerization conditions and the results thereof are shown in Tables 3 and 4, respectively.

Comparative Example B2

The procedures in Example B6 were repeated except that the triethyl borate as a catalyst component (C) was not used in the preparation of a catalyst dispersion.

The polymerization conditions and the results thereof are shown in Tables 3 and 4, respectively.

Example B7

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulverized for 40 hours), 130 g of anhydrous magnesium chloride, 15 g of silicon tetrachloride and 15 g of dibutyl ether. The mixture in the pot was sealed under a nitrogen atmosphere and then pulverized in a vibration mill for 80 hours under the conditions of a vibrational amplitude of 5 mm and a motor speed of 1,700 rpm. The resulting pulverized product is hereinafter referred to as A-3B.

The Ti content carried in the solid catalyst component (A-3B) thus obtained was 4.82% by weight.

Preparation of a catalyst dispersion

Into a 1-liter flask amply purged with nitrogen were introduced 400 ml of n-heptane which had been amply deaerated and purified, 10 g of the solid catalyst component (A-3B) mentioned above, 14.6 g of diethylaluminum chloride (B), and 62.9 ml of hexene-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to obtain a catalyst dispersion having a concentration of 0.4 g of solid catalyst per liter of heptane.

High-pressure polymerization of ethylene

Polymerization was carried out similarly as in Example B1.

The polymnerization conditions and the results thereof are shown in Tables 3 and 4, respectively.

Comparative Example B3

The procedures in Example B7 were repeated except that the triethyl borate as a catalyst component (C) was not used in the preparation of a catalyst dispersion.

The polymerization conditions and the results thereof are shown in Tables 3 and 4, respectively.

Example B8

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulverized for 40 hours), 130 g of anhydrous magnesium chloride, 15 g of silicon tetrachloride and 15 g of tetraethyl silicate. The mixture in the pot was sealed under a nitrogen atmosphere and then pulverized in a vibration mill for 80 hours under the conditions of a vibrational amplitude of 5 mm and a motor speed of 1,700 rpm. The resulting pulverized product is hereinafter referred to as A-4B.

The Ti content supported in the solid catalyst component (A-4B) thus obtained was 4.78% by weight.

Preparation of a catalyst dispersion

Into a 1-liter flask amply purged with nitrogen were introduced 400 ml of n-heptane which had been amply deaerated and purified, 10 g of the solid catalyst component (A-4B) mentioned above, 14.4 g of diethylaluminum chloride (B), and 62.4 ml of hexane-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to prepare a catalyst dispersion having a concentration of 0.4 g of solid catalyst per liter of heptane.

High-pressure polymerization of ethylene

Polymerization was carried out similarly as in Exmaple B1.

The polymerization conditions and the results thereof are shown in Tables 3 and 4, respectively.

Comparative Example B4

The procedures in Example B8 were repeated except that the triethyl borate as a catalyst component (C) was not used in the preparation of a catalyst dispersion.

The polymerization conditions and the results thereof are shown in Tables 3 and 4, respectively.

Example B9

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulverized for 40 hours), 130 g of anhydrous magnesium chloride, 15 g of n-butyl chloride and 15 g of methyl methacrylate. The mixture in the pot was sealed under a nitrogen atmosphere and then pulverized in a vibration mill for 80 hours under the conditions of a vibrational amplitude of 5 mm and a motor speed of 1,700 rpm. The resulting pulverized product is hereinafter referred to as A-5B.

The Ti content supported in the solid catalyst component (A-5B) thus obtained was 4.94% by weight.

Preparation of a catalyst dispersion

Into a 1-liter flask amply purged with nitrogen were introduced 400 ml of n-heptane which had been amply deaerated and purified, 10 g of the solid catalyst component (A-5B) mentioned above, 15.0 g of diethylaluminum chloride (B), and 64.5 ml of hexene-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to prepare a catalyst dispersion having a concentration of 0.4 g of solid catalyst per liter of heptane.

High-pressure polymerization of ethylene

Polymerization was carried out similarly as in Example B1.

The polymerization conditions and the results thereof are shown in Tables 3 and 4, respectively.

Comparative Example B5

The procedures in Example B9 were repeated except that the triethyl borate as a catalyst component (C) was not used in the preparation of a catalyst dispersion.

The polymerization conditions and the results thereof are shown in Tables 3 and 4, respectively.

Example B10

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [TiCl$_3$(AA)] and preliminarily pulveriized for 40 hours), 130 g of anhydrous magnesium chloride, 15 g of phosphorus pentachloride and 15 g of methyl methacrylate. The mixture in the pot was sealed under a nitrogen atmosphere and then pulverized in a vibration mill for 80 hours under the conditions of a vibrational amplitude of 5 mm and a motor speed of 1,700 rpm. The resulting pulverized product is hereinafter referred to as A-6B.

The Ti content carried in the solid catalyst component (A-6B) thus obtained was 4.81% by weight.

Preparation of a catalyst dispersion

Into a 1-liter flask amply purged with nitrogen were introduced 400 ml of n-heptane which had been amply deaerated and purified, 10 g of the solid catalyst component (A-6B) mentioned above, 14.6 g of diethylaluminum chloride (B), and 62.8 ml of hexene-1 which had been amply deaerated and purified. The mixture was caused to react at 60° C. for 1.5 hours.

The catalyst dispersion was supplied with triethyl borate (C) in such an amount as to make the molar ratio B/Al 0.15 and then diluted with n-heptane to prepare a catalyst dispersion having a concentration of 0.4 g of solid catalyst per liter of heptane.

High-pressure polymerization of ethylene

Polymerization was carried out similarly as in Example B1.

The polymerization conditions and the results thereof are shown in Tables 3 and 4, respectively.

Comparative Example B6

The procedures in Example B10 were repeated except that the triethyl borate as a catalyst component (C) was not used in the preparation of a catalyst dispersion.

The polymerization conditions and the results thereof are shown in Tables 3 and 4, respectively.

TABLE 3

(Polymerization Conditions)

| | Conditions of preparing catalyst | | | | Polymerization conditions | | Conditions of supplying monomers | | | |
|---|---|---|---|---|---|---|---|---|---|---|
| Experiments | Catalyst component (A) | Catalyst component (B) | Catalyst component (C) | (C)/(B) (mole ratio) | Pressure (kg/cm$^2$) | Temperature (°C.) | Total supply (kg/hr) | Co-monomer | Q'ty of co-monomer (wt. %) | Q'ty of hydrogen (mole %) |
| Exam. B1 | A-1B | Diethyl-aluminum chloride | Triethyl borate | 0.15 | 980 | 250 | 30 | Hexeme-1 | 50 | 0.3 |
| Exam. B2 | " | Diethyl-aluminum chloride | " | 0.25 | " | " | " | " | " | " |
| Exam. B3 | " | Diethyl-aluminum chloride | Trimethyl borate | 0.1 | " | " | " | " | " | " |
| Exam. B4 | " | Diethyl-aluminum chloride | Triphenyl borate | 0.2 | " | " | " | " | " | " |
| Exam. B5 | " | Diethyl-aluminum chloride | Diethyl phenyl-borate | 0.3 | " | " | " | " | " | " |
| Comp. Exam. B1 | " | Diethyl-aluminum chloride | No | 0 | " | " | " | " | " | " |
| Exam. B6 | A-2B | Diethyl-aluminum chloride | Triethyl borate | 0.15 | " | " | " | " | " | " |
| Comp. Exam. B2 | " | Diethyl-aluminum chloride | No | 0 | " | " | " | " | " | " |
| Exam. B7 | A-3B | Diethyl-aluminum chloride | Triethyl borate | 0.15 | " | " | " | " | " | " |
| Comp. Exam. B3 | " | Diethyl-aluminum chloride | No | 0 | " | " | " | " | " | " |
| Exam. B8 | A-4B | Diethyl-aluminum chloride | Triethyl borate | 0.15 | " | " | " | " | " | " |
| Comp. Exam. B4 | " | Diethyl-aluminum chloride | No | 0 | " | " | " | " | " | " |
| Exam. B9 | A-5B | Diethyl-aluminum chloride | Triethyl borate | 0.15 | " | " | " | " | " | " |
| Comp. Exam. B5 | " | Diethyl-aluminum chloride | No | 0 | " | " | " | " | " | " |
| Exam. B10 | A-6B | Diethyl-aluminum chloride | Triethyl borate | 0.15 | " | " | " | " | " | " |
| Comp. Exam. B6 | " | Diethyl-aluminum chloride | No | 0 | " | " | " | " | " | " |

TABLE 4

(Result of Polymerization)

| Experiments | Catalyst activity g-PE/g-(A) | MFR g/10 min. | FR | Polymer density | Q value (Mw/Mn) | Double bond*[1] (number/1000 C) | | | | Hexane*[2] soluble (wt. %) |
|---|---|---|---|---|---|---|---|---|---|---|
| | | | | | | Trans | Terminal vinyl | Vinyli-dene | Total | |
| Exam. B1 | 12800 | 1.52 | 7.7 | 0.9327 | 3.8 | 0.10 | 0.86 | 0.10 | 1.06 | 1.1 |
| Exam. B2 | 10500 | 0.68 | 7.6 | 0.9331 | 3.6 | 0.07 | 0.63 | 0.07 | 0.77 | 0.8 |
| Exam. B3 | 11000 | 1.21 | 7.7 | 0.9329 | 3.8 | 0.07 | 0.75 | 0.08 | 0.90 | 1.1 |
| Exam. B4 | 12100 | 2.03 | 7.8 | 0.9326 | 4.0 | 0.10 | 0.86 | 0.08 | 1.04 | 1.8 |
| Exam. B5 | 13700 | 5.04 | 7.8 | 0.9325 | 3.9 | 0.10 | 0.91 | 0.10 | 1.11 | 2.5 |
| Comp. Exam. B1 | 15300 | 14.25 | 8.0 | 0.9320 | 4.2 | 0.11 | 1.03 | 0.11 | 1.25 | 3.5 |
| Exam. B6 | 13500 | 2.55 | 7.7 | 0.9320 | 3.9 | 0.09 | 0.82 | 0.08 | 0.99 | 2.0 |
| Comp. Exam. B2 | 16500 | 15.05 | 8.0 | 0.9321 | 4.0 | 0.10 | 1.12 | 0.12 | 1.34 | 4.0 |
| Exam. B7 | 8500 | 1.71 | 8.1 | 0.9328 | 4.2 | 0.08 | 0.72 | 0.07 | 0.87 | 1.9 |
| Comp. Exam. B3 | 10300 | 8.52 | 8.2 | 0.9324 | 4.3 | 0.10 | 0.88 | 0.08 | 1.06 | 3.7 |
| Exam. B8 | 11200 | 3.44 | 7.7 | 0.9333 | 3.8 | 0.10 | 0.90 | 0.09 | 1.09 | 2.1 |
| Comp. Exam. B4 | 13300 | 8.52 | 7.9 | 0.9327 | 4.0 | 0.12 | 1.22 | 0.10 | 1.44 | 3.5 |
| Exam. B9 | 11600 | 1.50 | 7.8 | 0.9330 | 3.9 | 0.08 | 0.65 | 0.08 | 0.81 | 1.8 |
| Comp. Exam. B5 | 14500 | 12.02 | 8.0 | 0.9321 | 4.1 | 0.11 | 1.05 | 0.10 | 1.26 | 4.3 |
| Exam. B10 | 6800 | 1.92 | 7.9 | 0.9331 | 3.9 | 0.08 | 0.72 | 0.08 | 0.88 | 2.1 |

TABLE 4-continued

| | Catalyst | | | (Result of Polymerization) | | | | | | Hexane[2] |
| | activity | MFR | | Polymer | Q value | Double bond[1] (number/1000 C) | | | | soluble |
| Experiments | g-PE/g-(A) | g/10 min. | FR | density | (Mw/Mn) | Trans | Terminal vinyl | Vinylidene | Total | (wt. %) |
| --- | --- | --- | --- | --- | --- | --- | --- | --- | --- | --- |
| Comp. Exam. B6 | 8700 | 7.53 | 8.2 | 0.9335 | 4.3 | 0.11 | 1.15 | 0.12 | 1.38 | 4.4 |

Note:
[1]Determined by means of infrared spectra.
[2]8 hour-extracts with boiling hexane.

Example C1

Preparation of solid catalyst component (A)

A stainless-steel pot having an internal volume of 1 liter was charged with 900 ml in apparent volume of stainless-steel balls 12.7 mm in diameter. Placed therein were 40 g of titanium trichloride (which had been prepared through reduction with metallic aluminum [$TiCl_3(AA)$] and preliminarily pulverized for 40 hours), 130 g of anhydrous magnesium chloride, 15 g of silicon tetrachloride and 15 g of methyl methacrylate. The mixture in the pot was sealed under nitrogen atmosphere and then pulverized in a vibration mill for 80 hours.

The Ti content carried in the solid catalyst component thus obtained was 4.97% by weight. The resulting pulverized product is hereinafter referred to as A-1C.

Preparation of a catalyst dispersion

Into a 1-liter flask amply purged with nitrogen were intorduced 250 ml of n-heptane which had been amply deaerated and purified, and then 5 g of the solid catalyst component (A-1C) mentioned above and diethylaluminum chloride (B) in such an amount as to make the atomic ratio Al/Ti 12. Thereto was introduced hexene-1 which had been amply deaerated and purified in such an amount as to make the molar ratio hexene-1/Ti 50, and the resulting mnixture was stirred for 1.5 hours. In addition, diphenyldimethoxymethane (C) was added thereto in such an amount as to make the molar ratio of the oxygen-containing compound/Ti 0.2.

The resulting catalyst dispersion was placed in a catalyst-preparation tank equipped with a stirrer, the atmosphere of which had been purged with nitrogen, and diluted with n-heptane to adjust the concentration of the solid catalyst component to 0.2 g/liter.

High-pressure polymerization of ethylene

Copolymerization of ethylene with hexene-1 was carried out in a 1.5-liter (internal volume) autoclave-type continuous reactor equipped with a stirrer under the conditions as shown in Table 5.

Details of the results are shown in Table 6.

Examples C2 and C3

The procedures in Example C1 were repeated except that ethyl orthobenzoate or 1,1-diphenyl-1-methoxyethane was used, in place of the diphenyldimethoxymethane as an oxygen-containing compound of the catalyst component (C), in the preparation of a catalyst dispersion.

Details of the polymerization conditions and the results are shown in Tables 5 and 6, respectively.

Comparative Example C1

The procedures in Example C1 were repeated except that the diphenyldimethoxymethane as an oxygen-containing compound of the catalyst component (C) was not used.

Details of the polymerization conditions and the reuslts are shown in Tables 5 and 6, respectively.

Example C4

Preparation of solid catalyst component (A)

Into a 1-liter flask which had been amply purged with nitrogen were introduced 200 ml of n-heptane which had been amply deaerated and purified, 1 mol of $MgCl_2$, 3.5 mmol of $AlCl_3$, 0.028 mol of $Ti(OC_4H_9)_4$ and then 0.07 mol of n-butanol. The resulting mixture was heated to 70° C. and stirred for 1 hour.

0.02 mol of titanium tetrachloride and 1.5 mol of methylhydrogenpolysiloxane were introduced thereinto, and the mixture was stirred for an additional 1 hour.

After termination of the reaction, the reaction product was washed well with heptane to prepare a solid catalyst component (A).

The Ti content carried therein was 8.1% by weight. The solid catalyst component (A) thus obtained is hereinafter referred to as A-2C.

Preparation of a catalyst dispersion

The procedures in Example C1 were repeated.

Polymerization of ethylene

The procedures in Example C1 were repeated.

Details of the plymerization conditions and the results are shown in Tables 5 and 6, respectively.

Comparative Example C2

The procedures in Example C4 were repeated except that the diphenyldimethoxymethane as an oxygen-containing compound of the catalyst component (C) was not used.

Details of the polymerization conditions and the results thereof are shown in Tables 5 and 6, respectively.

TABLE 5

| Experiments No. | Type of solid catalyst (A) | Type of organo-aluminum (B) | C—OR compound (C) | | Polymerization conditions | | | Supply conditions | | | |
| | | | Type* | Amount (mole ratio to Al) | Pressure (kg/cm²) | Temperature (°C.) | Reaction time (sec.) | Total supply (Kg/hr.) | Type of co-monomer | Amount of co-monomer (wt. %) | Amount of hydrogen (mole %) |
| --- | --- | --- | --- | --- | --- | --- | --- | --- | --- | --- | --- |
| Exam. C1 | A-1C | DEAC** | (a) | 0.2 | 1000 | 260 | 40 | 30 | hexene-1 | 70 | 0.3 |
| Exam. C2 | " | " | (b) | 0.3 | " | " | " | " | " | " | " |
| Exam. C3 | " | " | (c) | 0.3 | " | " | " | " | " | " | " |
| Comp. Exam. C1 | " | " | — | — | " | " | " | " | " | " | " |
| Exam. C4 | A-2C | " | (a) | 0.2 | " | " | " | " | " | " | " |

TABLE 5-continued

| Experiments No. | Type of solid catalyst (A) | Type of organo-alumi-num (B) | C—OR compound (C) | | Polymerization conditions | | | Supply conditions | | | |
|---|---|---|---|---|---|---|---|---|---|---|---|
| | | | Type* | Amount (mole ratio to Al) | Pressure (kg/cm²) | Temperature (°C.) | Reaction time (sec.) | Total supply (Kg/hr.) | Type of co-monomer | Amount of co-monomer (wt. %) | Amount of hydrogen (mole %) |
| Comp. Exam. C2 | " | " | — | — | " | " | " | " | " | " | " |

*(a): diphenyldimethoxymethane
(b): ethyl orthobenzoate
(c): 1,1-diphenyl-1-methoxyethane
**DEAC: diethylaluminum chloride

TABLE 6

| Experiments | Catalyst activity g-PE/g-(A) | MFR g/10 min. | FR | Polymer density | Q value (Mw/Mn) | Double bond (number/1000 C) | | | | Hexane soluble (% by wt) |
|---|---|---|---|---|---|---|---|---|---|---|
| | | | | | | Trans | Terminal vinyl | Vinylidene | Total | |
| Exam. C1 | 13900 | 0.9 | 8.2 | 0.9225 | 4.0 | 0.08 | 0.53 | 0.10 | 0.71 | 1.3 |
| Exam. C2 | 15800 | 2.5 | 8.1 | 0.9201 | 3.9 | 0.09 | 0.73 | 0.10 | 0.92 | 1.5 |
| Exam. C3 | 11800 | 1.5 | 8.0 | 0.9230 | 3.6 | 0.08 | 0.62 | 0.10 | 0.80 | 1.5 |
| Comp. Exam. C1 | 19800 | 10.3 | 7.8 | 0.9208 | 3.6 | 0.11 | 1.23 | 0.11 | 1.45 | 12.0 |
| Exam. C4 | 12300 | 0.6 | 8.8 | 0.9271 | 4.3 | 0.08 | 0.65 | 0.09 | 0.82 | 1.8 |
| Comp. Exam. C2 | 17500 | 5.8 | 8.6 | 0.9251 | 4.3 | 0.09 | 0.97 | 0.10 | 1.16 | 8.8 |

What is claimed is:

1. A process for polymerizing ethylene, which comprises:

contacting ethylene or ethylene and at least one α-olefin at a temperature not less than 125° C. and under a pressure not less than 200 kg/cm² with a catalyst consisting essentially of a combination of components (A), (B) and (C) with the molar ratio of component (C) to aluminum in component (B) ranging from 0.05 to 2:

(A) a solid catalyst component containing at least titanium, magnesium and chlorine prepared by mixing and pulverizing at least the compounds (1) and (2) out of the following compounds (1) through (4):
  (1) a halogenated magnesiumm compound,
  (2) titanium trichloride,
  (3) an electron donor, and
  (4) a halogenated compound of an element of Group III, IV, or V in the Periodic Table;
(B) an organoaluminum compound; and
(C) an organic compound selected from the group consisting of a compound having a P-O-C bond structure, a compound having a B-O-C bond structure and a compound having a C-O-R bond structure, said C-O-R bond structure containing compound being of the formula:

(i) $R^1C(OR^2)_3$     (C-1)

wherein $R^1$ and $R^2$ each denote a hydrocarbon residue having 1 to 12 carbon atoms, (ii) $R^3R^4C(OR^5)_2$     (C-2)

wherein $R^3$ and $R^5$ each denote a hydrocarbon residue having 1 to 12 carbon atoms; $R^4$ denotes hydrogen or a hydrocarbon residue having 1 to 12 carbon atoms; $R^3$ and $R^4$ may be bonded to each other to form a ring; and two $R^5$ groups, which may be identical or different, may be bonded to each other to form a ring, and (iii) $R^6R^7R^8C(OR^9)$     (C-3)

wherein $R^6$ and $R^9$ each denote a hydrocarbon residue having 1 to 12 carbon atoms; $R^7$ and $R^8$ each denote hydrogen or a hydrocarbon residue having 1 to 12 carbon atoms; and at least two of the groups $R^6$, $R^7$, $R^8$, and $R^9$ may be bonded to each other to form a ring, thereby polymerizing said ethylene or ethylene-α-olefin mixture.

2. The process according to claim 1, wherein the organoaluminum compound is an alkylaluminum halide.

3. The process according to claim 1, wherein the electron donor is selected from the group consisting of compounds of the formula:

RCCOR', RCOR', ROR', and $R_{4-n}Si(OR')_n$.

wherein R and R' are identical or different from each other and each denotes a hydrocarbon radical having 1 to 12 carbon atoms; and n is defined by the relation: $0 < n \leq 4$.

4. The process according to claim 1, wherein the halogenated compound of the element in Group III, IV or V is a halogenosilicone of the formula: $R_nSiCl_{4-n}$, wherein R denotes a hydrocarbon residue having 1 to 12 carbon atoms, and n is an integer defined by the relation: $0 \leq n < 4$.

5. The process according gto claim 1, wherein said solid catalyst component (A) has a titanium content of 0.5 to 15% by weight, a Ti/Mg atomic ratio of 0.05 to 0.5 and a chlorine content of 30–70% by weight.

6. The process according to claim 1, wherein the quantity of said organoaluminum compound (B) to said solid catalyst component (A) is such that the atomic ratio of aluminum in the organoaluminum compound to titanium in the solid catalyst component ranges from 1 to 100.

7. The process according to claim 1, wherein the compound having a P-O-C bond is a compound of the formula:

$X_aY_bP(OR)_c$ or $X_pY_qP(O)(OR)_r$.

wherein R is a hydrocarbon radical of 1 to 18 carbon atoms; each of X and Y is respectively a hydrocarbon radical of 1 to 12 carbon atoms; a, b and c are numbers which satisfy the relationships: $a+b+c=3$, $0 \leq a < 3$, $0 \leq b < 3$ and $0 < c \leq 3$; and p, q and r are numbers which satisfy the relationships: $p+q+r=3$, $0 \leq p < 3$, $0 \leq q < 3$ and $0 < r \leq 3$.

8. The process according to claim 1, wherein the compound having a P-O-C bond is a phosphite ester of the formula:

$$X_a Y_b P(OR)_c$$

wherein R is a hydrocarbon radical of 1 to 18 carbon atoms, each of X and Y is respectively a hydrocarbon radical of 1 to 12 carbon atoms, and a, b and c are numbers which satisfy the relationships: $a+b+c=3$, $0 \leq a < 3$, $0 \leq b < 3$ and $0 < c \leq 3$.

9. The process as claimed in claim 1, wherein the compound having a B-O-C bond is a triester of boric acid.

10. The process as claimed in claim 1, wherein the compound having a C-O-R bond is an orthocarboxylate ester, an acetal or a ketal of the formula:

$$R^1 C(OR^2)_3 \text{ or } R^3 R^4 C(OR^5)_2,$$

wherein each of $R^1$ and $R^2$ is respectively a hydrocarbon radical of 1 to 12 carbon atoms, each of $R^3$ and $R^5$ is respectively a hydrocarbon radical of 1 to 12 carbon atoms, and $R^4$ is hydrogen atom or hydrocarbon radical of 1 to 12 carbon atoms.

* * * * *